Patented Aug. 2, 1938

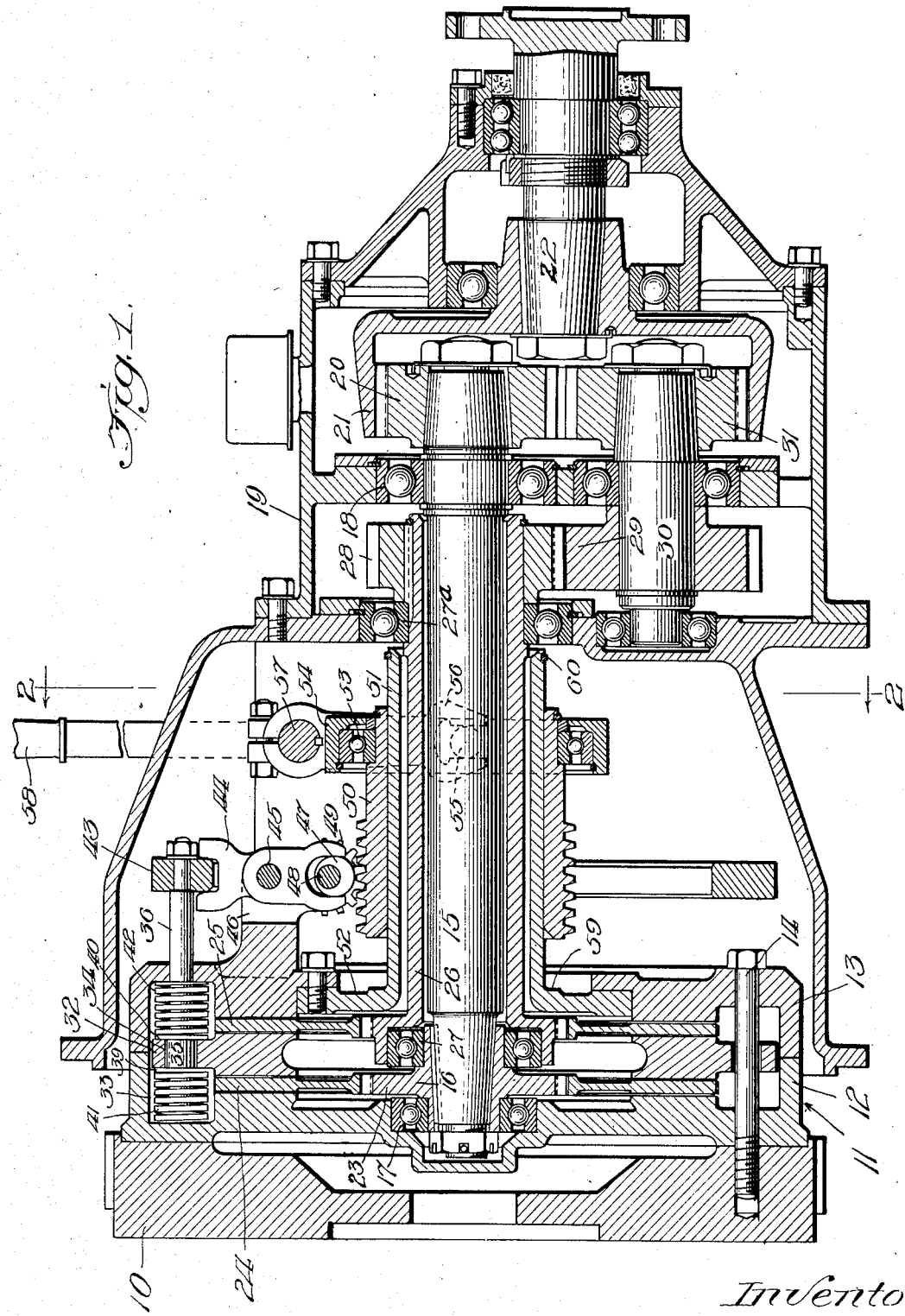

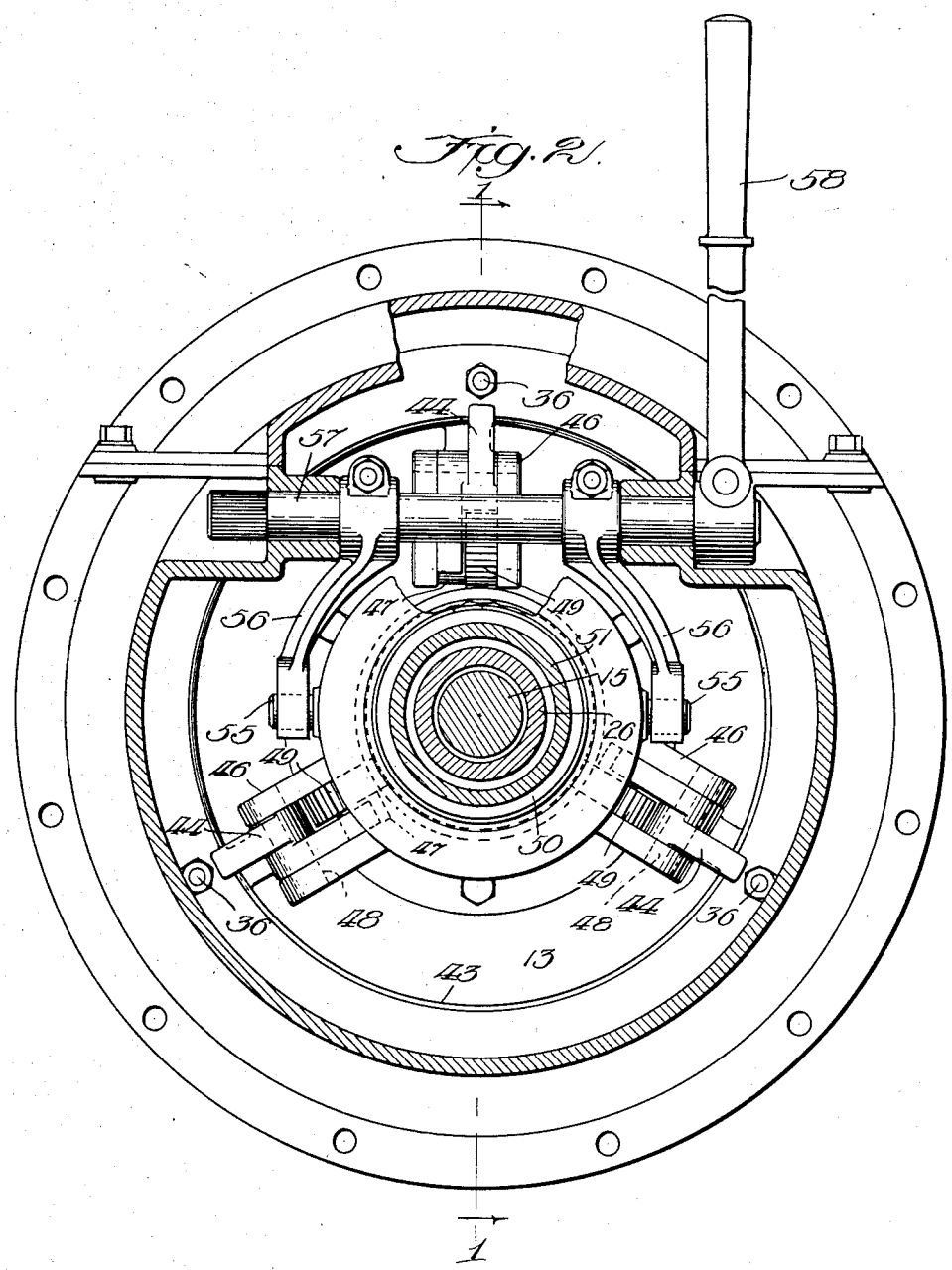

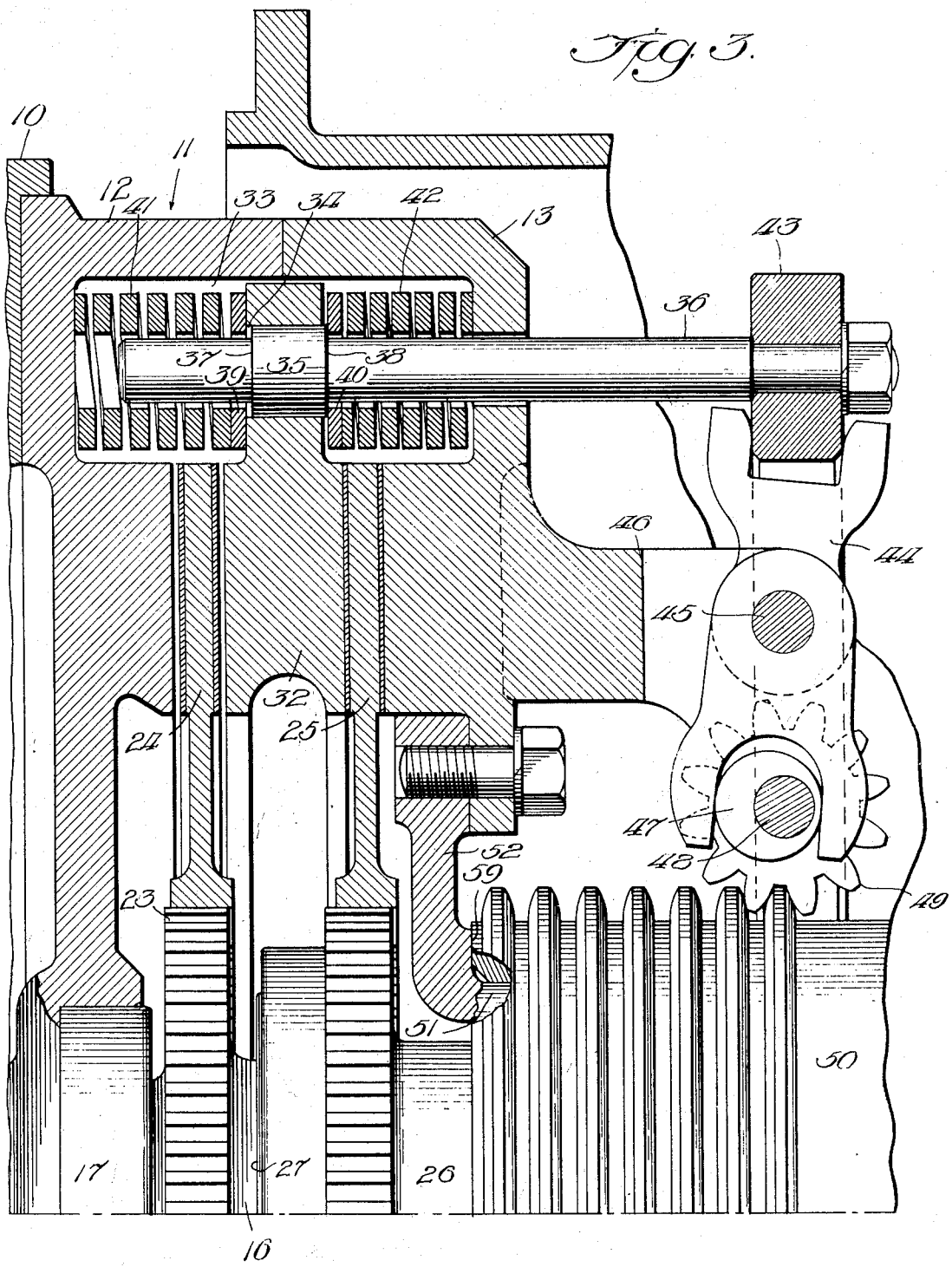

2,125,433

UNITED STATES PATENT OFFICE 2,125,433

CLUTCH MECHANISM

Henry J. Dunkelow, Racine, Wis., assignor to Twin Disc Clutch Company, Racine, Wis., a corporation of Wisconsin Application August 22, 1936, Serial No. 97,308

17 Claims. (Cl. 192—48)

My invention relates to a clutch mechanism for effecting a transmission of power between driving and driven shafts and is more particularly concerned with providing a mechanism of the spring-loaded type.

One object of my invention is to devise a mechanism provided with a pair of separately actuated clutches having a common clamping member, the clutches being spring-loaded and held in their respective driving positions by the operation of shifting the clamping member into either operative position, and the clutch elements being entirely enclosed, thereby enabling the use of dry plate clutches.

A further object is to devise a mechanism having a common clamping member which is maintained in an intermediate or neutral position by the opposing action of the clutch loading springs, and in which one of the sets of springs is compressible to permit the unrestrained actuation of the member into driving position by the other set.

A further object is to devise a mechanism having clutches of the so-called dry plate type which are mounted in an enclosing casing constituting an element of each clutch and which is adapted for driven engagement with a suitable member, such as a flywheel and the like.

A further object is to devise a mechanism which employs a pair of single plate clutches, the friction plates of each clutch being separately connected to the parts to be driven and clamped by a member common to both clutches which is positively driven by a main power source.

These and further objects of my invention will be set forth in the following specification, reference being had to the accompanying drawings, and the novel means by which said objects are effectuated will be definitely pointed out in the claims.

In the drawings:

Figure 1 is a sectional elevation of my improved mechanism as viewed along the line 1—1 in Fig. 2, looking in the direction of the arrows, the mechanism being shown in connection with a reversing gear, such as is commonly employed for marine installation.

Fig. 2 is a section along the line 2—2 in Fig. 1, looking in the direction of the arrows.

Fig. 3 is a fragmentary, enlarged, elevational view, partly in section, of the mechanism illustrated in Fig. 1, showing the positions of the clutch devices and the operators therefor when the mechanism is conditioned for the transmission of reverse drive.

Referring to Fig. 1, the numeral 10 designates a driving member, such as a flywheel and the like, which is suitably connected to a power source (not shown). A clutch casing 11 composed of the separable, complementary parts 12 and 13 is secured to one face of the flywheel 10 by bolts 14.

One end of a direct drive shaft 15 is keyed to a hub 16 which is journaled in a bearing 17 carried by the casing part 12 and located in axial alignment with the axis of the flywheel 10, while adjacent the opposite end, the shaft is journaled in a bearing 18 that is mounted in a main housing 19 which encloses the clutch and gear mechanism hereinafter described. A pinion 20 is keyed or otherwise fixedly attached to the shaft 15 and is in constant mesh with an internal, driven shaft gear 21 that is secured to a driven shaft 22.

The hub 16 is provided with an externally toothed, annular flange 23 that is in constant mesh with similar teeth provided on the inner periphery of a friction disk 24 whose opposite faces may be provided with suitable friction material. The disk 24 is located adjacent the inner face of the casing part 12 and a similar friction disk 25 is located adjacent the inner face of the casing part 13 and has toothed driving engagement with a reverse drive sleeve 26 that surrounds and is concentric with the shaft 15. The sleeve is supported entirely clear of contact with the shaft by means of a bearing 27 at one end that is carried by the hub 16 and adjacent the opposite end by a bearing 27ª that is mounted in the housing 19. Accordingly, the sleeve 26 is freely rotatable relative to and independently of the direct drive shaft 15 and secured to the sleeve is a pinion 28 that is in constant mesh with a gear 29 fast on a countershaft 30 that is suitably journaled in the housing 19. A pinion 31 is also secured to the countershaft 30 and permanently meshes with the internal gear 21, on the opposite side of the axis of the shaft 22 from the pinion 20, thus providing the maximum space for the reception of the last noted pinions.

From the foregoing, it will be understood that the shaft 15 and sleeve 26 constitute elements for transmitting direct and reverse drives, respectively, to the gearing described and that the connection of these parts with the flywheel 10 is respectively provided by a direct drive clutch defined by the clutch part 12 and friction disk 24, and a reverse drive clutch defined by the clutch part 13 and friction disk 25. A common clamping member 32 is provided for these clutches and is located between the disks 24 and 25, the bolts 14 also extending through the clamping member to drivably connect the same to the clutch casing. In the present construction, these clutches are of the dry plate type as permitted by the use of the enclosed clutch casing, but the mechanism may also be designed to provide for an operation of these clutches in oil spray or a dipping in oil, as circumstances may require. The manner in which the foregoing clutches are selectively engaged will now be described.

As shown in Fig. 1, the clutches are occupying a neutral position and the distance between the opposed faces of the casing parts 12 and 13 is such that, when the clamping member 32 is occupying the intermediate position shown, the friction disks 24 and 25 may freely accommodate themselves by an endwise movement so that they will occupy positions free of any contact with the faces of the member 32 and the casing parts 12 and 13.

The periphery of the member 32 extends into a counterbored recess 33 provided in the clutch casing and this recess is located outwardly of the peripheries of the disks 24 and 25 in order to accommodate the free positioning and action of the loading springs as hereinafter described. A plurality of equi-spaced apertures 34 is circumferentially arranged around the member 32 adjacent the outer periphery thereof and slidably mounted in each of these apertures is the enlarged portion 35 of an operating rod 36, the rod extending in opposite directions from the portion as clearly shown in Figs. 1 and 3.

Referring more particularly to Fig. 3, it will be seen that the portion 35 defines with the rod 36 annular shoulders 37 and 38 which face toward the casing parts 12 and 13, respectively. When the rod 36 is occupying the neutral position illustrated in Fig. 1, shiftable washers 39 and 40 which encircle the rod abut, respectively, against the shoulders 37 and 38 and loading springs 41 and 42 are interposed between the washer 39 and casing part 12 and the washer 40 and casing part 13, all respectively, the indicated casing parts constituting fixed abutments for the adjacent ends of the springs.

The rod 36 extends outwardly through a suitable opening provided in the casing part 13 and the ends of the rods 36 have fastened thereto a common actuating ring 43 which encircles the driving shaft 15. The outer, forked end of a lever 44 engages the sides of the ring 43 adjacent each rod 36 and this lever is pivoted on a pin 45 that is mounted in a bracket 46, preferably integrally formed with the casing part 13. The inner end of the lever 44 is also forked and embraces an eccentric 47 that is fixed on a shaft 48 which is also journaled in the bracket 46. A gear 49 is also fixed to the shaft 48 and it meshes with teeth formed by circumferentially grooving a sleeve 50 that is slidably mounted on a tubular extension 51. This extension encircles the reverse drive sleeve 26, but is entirely clear therefrom, and at one end is provided with an annular flange 52 which is securely bolted to the casing part 13. The rod 36, ring 43, lever 44, eccentric 47, gear 49 and the rack sleeve 50 constitute an operating mechanism for shifting the clamping member 32 endwise and it will be understood that as many of these operating mechanisms may be employed as desired. In the present arrangement, three mechanisms are employed and they are equi-spaced circumferentially around the clutch casing with the gear 49 of each mechanism meshing with the rack sleeve 50 which is common to all mechanisms.

The inner race of a ball bearing 53 is mounted on the sleeve 50 and suitably held against endwise movement, while the outer race is similarly mounted in an operating collar 54 that is provided with a pair of laterally extending trunnions 55 (see Fig. 2), each of which is embraced by the lower forked end of an operating rock arm 56. Each of these arms extends upwardly and is fixedly attached to an operating shaft 57 that is journaled in and extends transversely of the housing 19. One end of this shaft projects without the housing and has attached thereto an operating handle 58.

The operation of my improved clutch mechanism will now be described. Referring to Fig. 1, it will be assumed that the flywheel 10, and hence the clutch casing 11 are rotating at some determined speed, and that the clamping member 32 occupies the neutral position shown. So long as the indicated parts occupy the positions illustrated, the member 32 is maintained in the neutral position by the opposing action of the loading springs 41 and 42. These springs are arranged in opposing pairs around the clamping member 32 and the total extending force of the springs on one side of the member is substantially equal to the total extending force of the springs on the opposite side, it being understood that, when the member 32 is in the neutral position, each spring is somewhat compressed so that the tendency toward elongation by one spring of each opposing pair is restrained by the similar tendency of the other spring of the same pair, thus definitely holding the clamping member 32 in its neutral position. Moreover, in the assumed position of the parts of the mechanism, the high point of each eccentric 47 is located inwardly of the associated shaft 48, so that the eccentric is symmetrically positioned relative to the inner fork of the engaging lever 44, as clearly illustrated in Fig. 1. It will be noted that while the clutch casing and the associated mechanism are rotating with the flywheel, the operating rock arms 56 permit this rotation by reason of the association of the operating collar 54 with the outer race of the ball bearing 53.

If now it is desired to transmit a reverse drive to the driven shaft 22, the operating handle will be rocked in a clockwise direction, as viewed in Fig. 1, to thereby shift the rack sleeve 50 toward the left and, through its engagement with the gears 49, impart a clockwise rotation to the eccentrics 47 and thus rock the levers 44 in a clockwise direction on their respective pivots 45.

The operating rods 36 are thereby shifted endwise toward the right, as viewed in Figs. 1 and 3, and, due to the engagement of the shoulders 38 with the washers 40, the loading springs 42 are further compressed, while the loading springs 41 are permitted to extend and move the clamping member 32 to grip the friction disk 25 therebetween and the casing part 13, thus engaging the reverse drive clutch of the mechanism.

The shifting of the sleeve 50 ordinarily continues until the left end thereof abuts against a shoulder 59 provided on the flange 52 and, at this time, the high point of each eccentric 47 occupies the position substantially as illustrated in Fig. 3, that is, at a greater radial distance from the axis of the shaft 15 than the center of the associated eccentric shaft 48. Because of the relatively small throw eccentric construction, the loading springs 42 are definitely held in their further compressed positions, and the loading springs 41 therefore exert a free and unimpeded pressure against the clamping member 32. The springs 42 would also be held in the position shown even though the high point of each eccentric might be located slightly inwardly of the associated eccentric shaft. This situation might arise if the handle 58 was prevented for some reason from reaching its final reverse position, but still occupied some position at which the springs 41 loaded the reverse drive clutch.

This arrangement also provides for automatic compensation for wear of the friction facings on the disk 25. With the right hand or reverse drive clutch in engagement, the drive from the flywheel 10 is transmitted through the clutch casing 11, clamping member 32, friction disk 25, reverse drive sleeve 26, pinion 28 and then through the countershaft 30 and associated gearing to the driven shaft 22.

In order to effect a direct or forward drive, the operating handle 58 is rocked in a counter-clockwise direction to thereby shift the sleeve 50 toward the right, as viewed in Fig. 1, and thus, through the associated parts, move the operating rods 36 toward the left. The pressure of the loading springs 41 against the clamping member 32 is then released in the same manner as hereinbefore described for the loading springs 42, so that the latter springs are free to move the member 32 to clamp the friction disk 24 therebetween and the casing part 12. In this position of the parts, the high points of the eccentrics 47 may occupy a position to the right, as shown in Fig. 3, of the eccentric shaft 48, that is, in positions corresponding to those illustrated in Fig. 3. The limit of movement of the rack sleeve 50 toward the right is determined by a stop ring 60 that is fixedly attached to the tubular extension 51, and the loading springs 41 will be held in their compressed positions for reasons noted above.

In this position of the parts, the drive from the flywheel 10 is transmitted to the shaft 15 through the clutch casing 11, member 32, friction disk 24 and hub 16, and then through the pinion 20 to the driven shaft 22.

The foregoing mechanism may be embodied in an arrangement that is quite compact and in which the loading springs for the respective clutches are utilized to maintain the common clamping member therefor in neutral position. Moreover, because the respective clutches are engaged by the simple operation of freeing one of the sets of loading springs for clutch engaging action, the clutches may be thrown into engagement free of any tendency to grab or jerk. The construction provides an arrangement whereby the clutch and gear devices may be segregated into separated groups, so that it is possible to utilize dry plate clutches, although the invention is not restricted in this respect. Finally, while clutches employing single friction plates have been illustrated, it will be understood that the invention is also capable of adaptation to multiple disk clutches.

I claim:

1. In clutch mechanism, the combination of clutch devices connected to separate rotary parts, a clamping member connected to one of the devices and shiftable to drivably connect both devices, separate loading spring means contacting opposite sides of the member and acting against each other to hold the member in a neutral position, and means for disabling one of the spring means without affecting the other spring means said other spring means then shifting the member to driving position.

2. In clutch mechanism, the combination of clutch devices connected to separate rotary parts, a clamping member connected to one of the devices and shiftable to drivably connect both devices, separate, oppositely disposed, loading spring means having equal strength contacting opposite sides of the member and acting against each other to hold the same in a neutral position, and means for disabling one of the spring means without affecting the other spring means, said other spring means shifting the member to driving position.

3. In clutch mechanism, the combination of clutch devices connected to separate rotary parts, a clamping member connected to one of the devices and shiftable to drivably connect both devices, a pair of loading spring groups having equal strength engaging opposite sides of the member and acting against each other to hold the member in a neutral position, each group comprising a plurality of coil springs, and means for disabling one of the spring groups without affecting the other group to thereby free said other spring group to shift the member to driving position.

4. In clutch mechanism, the combination of clutch devices connected to separate rotary parts, a clamping disk connected for rotation with one of the devices and shiftable to drivably connect both devices, a plurality of rods spaced around the disk and each rod having an intermediate, enlarged portion slidable through the disk, a pair of shiftable washers mounted on each rod to abut the shoulders formed by the ends of the portion, respectively, a pair of coil loading springs encircling each rod between the washers, respectively, and the device to which the disk is connected constituting a fixed abutment for the springs, the springs of each pair being of equal strength and the opposing action of the springs of each pair holding the disk in neutral position, and means for shifting the rods to thereby compress one spring of each pair, the elongation of the other springs shifting the disk into driving position.

5. In clutch mechanism, the combination of clutch devices connected to separate rotary parts, a clamping disk connected for rotation with one of the devices and shiftable to drivably connect both devices, a plurality of rods spaced around the disk and each rod having an intermediate, enlarged portion slidable through the disk, a pair of shiftable washers mounted on each rod to abut the shoulders formed by the ends of the portion, respectively, a pair of coil loading springs encircling each rod between the washers, respectively, and the device to which the disk is connected constituting a fixed abutment for the springs, the springs of each pair being of equal strength and the opposing action of the springs of each pair holding the disk in neutral position, a ring common to the rods, and means for actuating the ring to thereby simultaneously shift the rods whereby one spring of each pair is compressed and the other springs are elongated to shift the disk into driving position.

6. In clutch mechanism, the combination of clutch devices connected to separate rotary parts, a clamping disk connected for rotation with one of the devices and shiftable to drivably connect both devices, a plurality of rods spaced around the disk and each having an intermediate, enlarged portion slidable through the disk, a pair of shiftable washers mounted on each rod to abut the shoulders formed by the ends of the portion, respectively, a pair of coil springs encircling each rod between the washers, respectively, and the device to which the disk is connected constituting a fixed abutment for the springs, the springs of each pair being of equal strength and their opposing action holding the disk in neutral position, and means for shifting each of the rods to thereby compress one spring of each pair and free the other springs to shift the disk into driving position comprising a lever engageable at one end with the rod, an eccentric engaging the opposite end of the lever, and means for simultaneously rotating the eccentrics to actuate the levers.

7. In clutch mechanism, the combination of clutch devices connected to separate rotary parts, a clamping disk connected for rotation with one of the devices and shiftable to drivably connect both devices, a plurality of rods spaced around the disk and each having an intermediate, enlarged portion slidable through the disk, a pair of shiftable washers mounted on each rod to abut the shoulders formed by the ends of the portion, respectively, a pair of coil springs encircling each rod between the washers, respectively, and the device to which the disk is connected constituting a fixed abutment for the springs, the springs of each pair being of equal strength and their opposing action holding the disk in neutral position, and means for shifting each of the rods to thereby compress one spring of each pair and free the other springs to shift the disk into driving position comprising a lever engageable at one end with the rod, an eccentric bearing against the opposite end of the lever, means for simultaneously rotating the eccentrics to actuate the levers, and means for stopping the rotation of the eccentrics when the highest points thereof are at a greater radial distance from the axis of the clutch devices than the centers of the eccentric shafts.

8. In clutch mechanism, the combination of a pair of clutches, a clamping member common to both clutches and shiftable to engage either clutch, loading spring means for each clutch contacting opposite sides of the member and acting against each other to hold the member in a neutral position, and means for disabling one of the spring means without affecting the other spring means to thereby free said other spring means to shift the member to engage the associated clutch.

9. In clutch mechanism, the combination of a pair of clutches, a clamping member common to both clutches and shiftable to engage either clutch, loading spring means for each clutch contacting opposite sides of the member, the spring means being oppositely disposed and acting against each other to hold the member in neutral position, and means for disabling either of the spring means without affecting the other spring means to thereby free said other spring means for causing the member to engage the associated clutch.

10. In clutch mechanism, the combination of a pair of clutches, a clamping member common to both clutches and shiftable to engage either clutch, loading spring groups of equal strength for each clutch engaging opposite sides of the member and acting against each other to hold the member in neutral position, each group comprising a plurality of coil springs, and means for disabling either one of the spring groups without affecting the other spring group to thereby free said other group for moving the member to engage the associated clutch.

11. In clutch mechanism, the combination of a pair of clutches, a clamping disk common to both clutches and shiftable to engage either clutch, a plurality of rods spaced around the disk and each having an intermediate, enlarged portion slidable through the disk, a pair of shiftable washers mounted on each rod to abut the shoulders formed by the ends of the portion, respectively, a pair of coil loading springs encircling each rod between the washers, respectively, and one of the members of each clutch, respectively, constituting fixed abutments for the contacting springs, the springs of each pair being of equal strength and their opposing action holding the disk in neutral position, and means for shifting the rods endwise in either direction to thereby compress one spring of each pair and free the other springs to cause by their elongation a movement of the disk to engage the associated clutch.

12. In clutch mechanism, the combination of a pair of clutches, a clamping disk common to both clutches and shiftable to engage either clutch, a plurality of rods spaced around the disk and each having an intermediate, enlarged portion slidable through the disk, a pair of shiftable washers mounted on each rod to abut the shoulders formed by the ends of the portion, respectively, a pair of coil loading springs encircling each rod between the washers, respectively, and one of the members of each clutch, respectively, as fixed abutments for the contacting springs, the springs of each pair being of equal strength and their opposing action holding the disk in neutral position, a ring common to the ends of the rods, and means for actuating the ring to thereby simultaneously shift the rods whereby one spring of each pair is compressed and the other springs are free to elongate and move the disk to engage the associated clutch.

13. In clutch mechanism, the combination of a pair of clutches, a clamping disk common to both clutches and shiftable to engage either clutch, a plurality of rods spaced around the disk and each having an intermediate, enlarged portion slidable through the disk, a pair of shiftable washers mounted on each rod to abut the shoulders formed by the ends of the portion, respectively, a pair of coil loading springs encircling each rod between the washers, respectively, and one member of each clutch, respectively, as fixed abutments for the contacting springs, the springs of each pair being of equal strength and their opposing action holding the disk in neutral position, and means for shifting the rods endwise in either direction to thereby compress one spring of each pair and free the other springs for elongation and movement of the disk to engage the associated clutch comprising a lever engageable at one end with each rod, an eccentric engaging the opposite end of the lever, and means for simultaneously rotating the eccentrics to rock the levers.

14. In clutch mechanism, the combination of a pair of clutches, a clamping disk common to both clutches and shiftable to engage either clutch, a plurality of rods spaced around the disk and each having an intermediate, enlarged portion slidable through the disk, a pair of shiftable washers mounted on each rod to abut the shoulders formed by the ends of the portion, respectively, a pair of coil loading springs encircling each rod between the washers, respectively, and one member of each clutch, respectively, as fixed abutments for the contacting springs, the springs of each pair being of equal strength and their opposing action holding the disk in neutral position, means for shifting the rods endwise in either direction to thereby compress one spring of each pair and free the other springs to actuate the disk and engage the associated clutch comprising a lever engageable at one end with each rod, an eccentric engaging the opposite end of the lever, means for simultaneously rotating the eccentrics to rock the levers, and means for stopping the rotation of the eccentrics when the high points thereof are at a greater radial distance from the axis of the clutches than the centers of the eccentric shafts.

15. In clutch mechanism, the combination of a hollow casing having a pair of opposed faces and adapted for connection to a first rotary part, a clamping disk positioned within and connected to the casing for rotation therewith, a pair of friction disks located in the casing on opposite sides of the clamping disk, respectively, and forming with the adjacent casing faces a pair of clutches, a plurality of rods spaced around and slidable through the clamping disk, each rod having a pair of shoulders, a pair of coil loading springs encircling each rod between the shoulders and casing faces, respectively, the faces constituting fixed abutments for the springs, the springs of each pair being of equal strength and their opposing action holding the clamping disk in neutral position, and means for shifting the rods endwise in either direction to thereby compress one spring of each pair and free the other springs to cause by their elongation a movement of the clamping disk to engage the associated clutch.

16. In clutch mechanism, the combination of clutch devices connected to separate rotary parts, a clamping disk connected for rotation with one of the devices and shiftable to drivably connect both devices, a plurality of rods spaced around the disk and each rod having a pair of shoulders, a pair of coil loading springs encircling each rod between the shoulders, respectively, and the device to which the disk is connected constituting fixed abutments for the springs, the springs of each pair being of equal strength and the opposing action of the springs of each pair holding the disk in neutral position, and means for shifting the rods to thereby compress one spring of each pair, the elongation of the other springs shifting the disk into driving position.

17. In clutch mechanism, the combination of a pair of clutches, a clamping disk common to both clutches and shiftable to engage either clutch, a plurality of rods spaced around the disk and each having a portion slidable through the disk and a pair of shoulders, a pair of coil loading springs encircling each rod between the shoulders, respectively, and one of the members of each clutch, respectively, constituting fixed abutments for the contacting springs, the springs of each pair being of equal strength and their opposing action holding the disk in neutral position, and means for shifting the rods endwise in either direction to thereby compress one spring of each pair and free the other springs to cause by their elongation a movement of the disk to engage the associated clutch.

HENRY J. DUNKELOW.